June 30, 1936.　　F. C. FANTZ　　2,046,155
RETURN BEND
Filed Feb. 15, 1933　　7 Sheets-Sheet 1

INVENTOR
Fred C. Fantz
BY Harry Lea Dodson
ATTORNEY

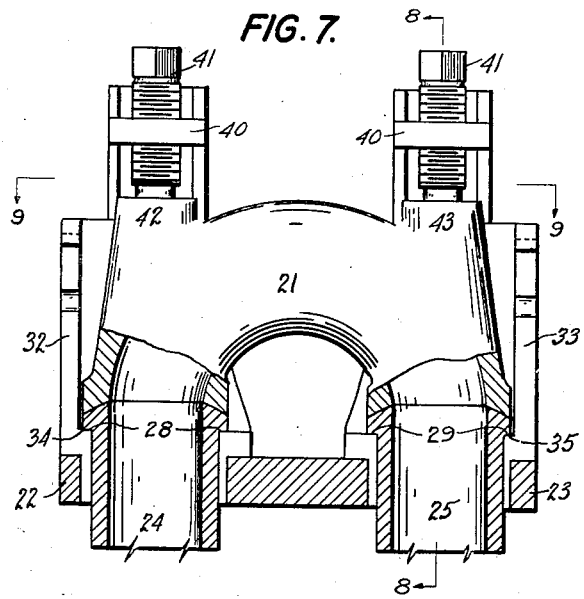
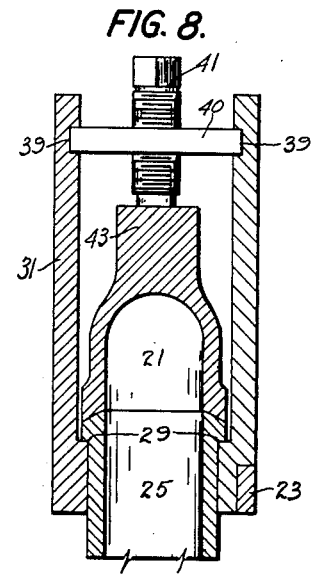
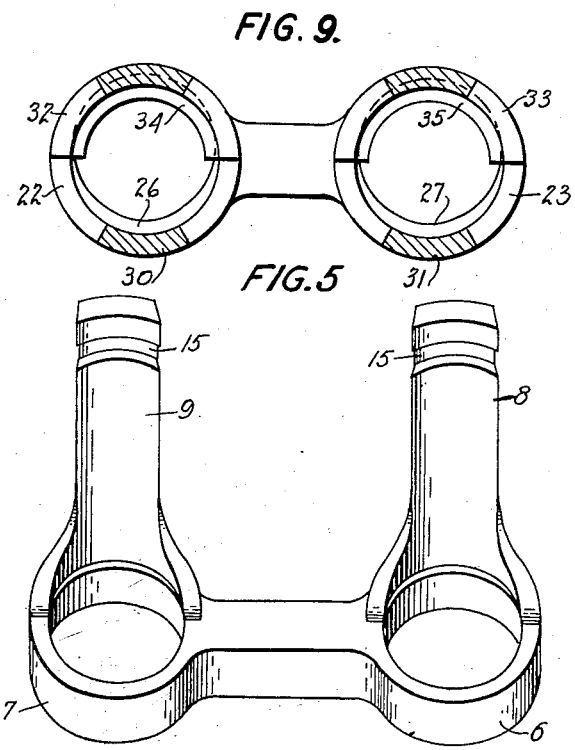
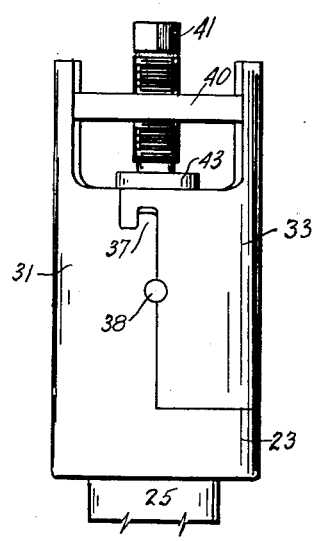

June 30, 1936.　　　　F. C. FANTZ　　　　2,046,155
RETURN BEND
Filed Feb. 15, 1933　　　7 Sheets-Sheet 3

INVENTOR
Fred C. Fantz
BY
Harvey Lee Dodson
ATTORNEY

June 30, 1936.　　　F. C. FANTZ　　　2,046,155
RETURN BEND
Filed Feb. 15, 1933　　　7 Sheets-Sheet 4

INVENTOR
Fred C. Fantz,
BY Harvey Lea Dodson
ATTORNEY

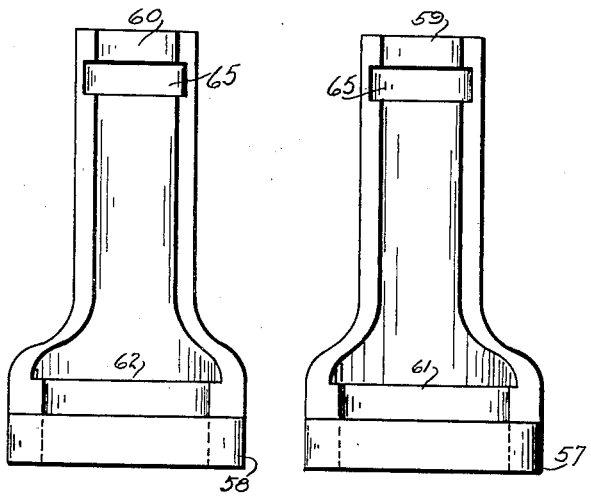
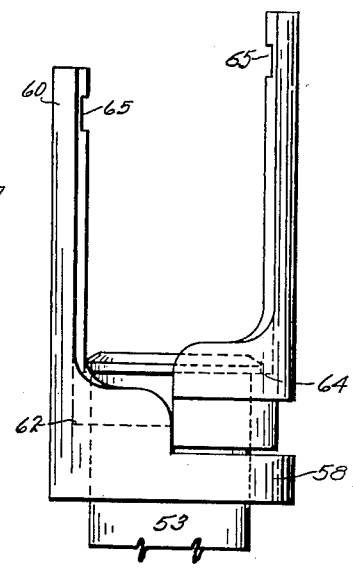
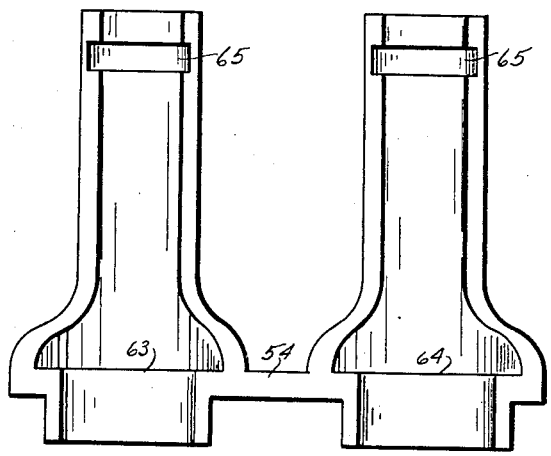

June 30, 1936.    F. C. FANTZ    2,046,155
RETURN BEND
Filed Feb. 15, 1933    7 Sheets-Sheet 6

INVENTOR
Fred C. Fantz
BY
Harry Lea Dodson
ATTORNEY

June 30, 1936.  F. C. FANTZ  2,046,155
RETURN BEND
Filed Feb. 15, 1933  7 Sheets-Sheet 7

INVENTOR
Fred C. Fantz
BY Harvey Lea Dodson
ATTORNEY

Patented June 30, 1936

2,046,155

UNITED STATES PATENT OFFICE 2,046,155

RETURN BEND

Fred C. Fantz, Webster Groves, Mo.

Application February 15, 1933, Serial No. 656,797

13 Claims. (Cl. 285—20)

My invention relates to that class of fittings which are employed for connecting the ends of adjacent tubes in the tube coil or bank in a cracking still so as to provide for a continuous passageway through the entire coil.

My invention has for its object to provide a construction which will permit the removal of any single tube for examination or replacement without having to disturb the adjacent tube.

A further object is to attain that result without having to use sectional metal rings or bushings or bolts for fastening the housing members together.

A further object is to provide a housing formed in sections having upwardly extending side walls on one section and means to lock the other sectional members having upwardly extending side walls into substantially a one piece housing.

A further object is to provide a different way of constructing the sectional housing so as to facilitate its manufacture.

A further object is to provide means on the side walls for locking them together so that they will remain in position when the U bend is removed, and also so that they will be held in position by detachable means at all times unless the detachable means are removed for the purpose of demounting the entire housing.

My means of accomplishing the foregoing objects may be more readily understood by having reference to the accompanying drawings which are hereunto annexed and made a part hereof, in which Fig. 1 is a side elevation of my improved fitting, part of the housing being broken away to show the interior construction;

Fig. 5 is a perspective view of one-half of the housing;

Fig. 7 is a side elevation of a modified form of construction, part of the wall being broken away and the remainder in section;

Fig. 8 is a sectional view taken on the line 8—8 in Fig. 7;

Fig. 9 is a section taken on the line 9—9 in Fig. 7;

Fig. 10 is an end elevation;

Fig. 18 is a side elevation of a modified form of housing.

Fig. 19 is a fragmentary portion of this form of housing;

Fig. 20 is an end elevation showing the method of assembling the housing, a fragmentary portion of the tube being shown in this view;

Figure 1:
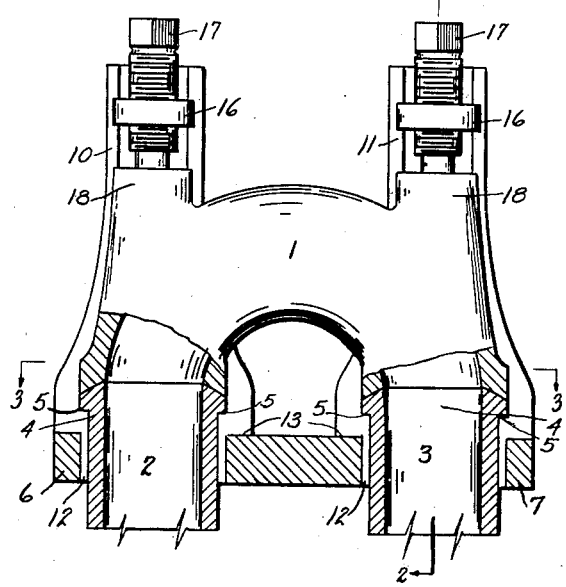
Figure 2:
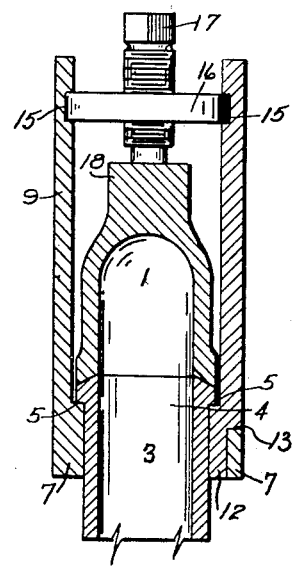
Fig. 2 is a section on the line 2—2 in Fig. 3.
Figure 3:
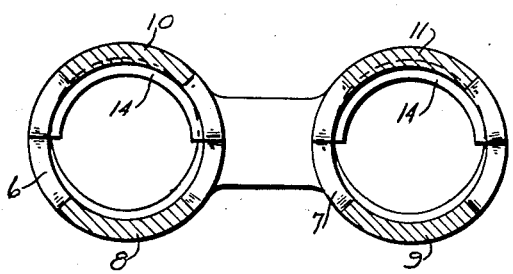
Fig. 3 is a section taken on the line 3—3 in Fig. 1.
Figure 4:
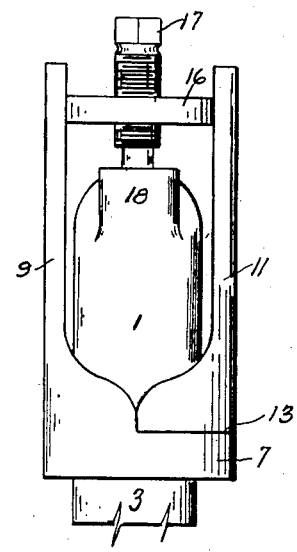
Fig. 4 is an end elevation.
Figure 11:
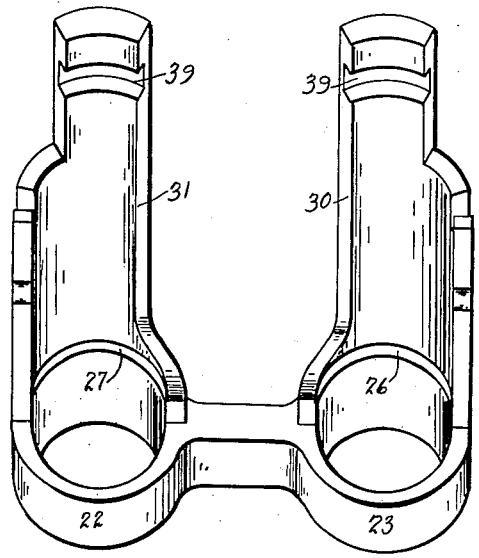
Fig. 11 is a perspective view of one-half of a modified form of housing.
Figure 6:
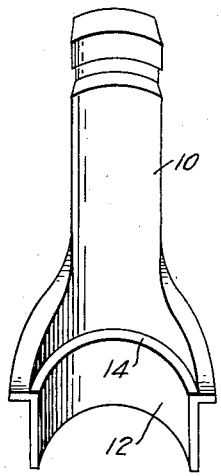
Fig. 6 is a perspective view of one of the fragmentary portions of the housing.
Figure 12:
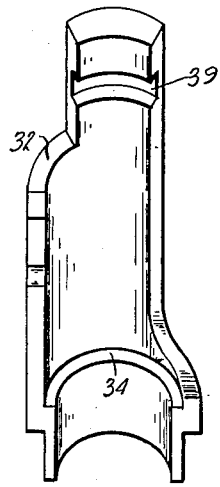
Fig. 12 is a perspective view of a fragmentary portion of the housing to be used with the forms shown in Fig. 11.

As shown in the drawings, Figs. 1 to 6, a return bend or U piece 1 is employed to connect the ends of a pair of tubes 2 and 3. Only a fragmentary portion of the tubes is shown as obviously they form no part of my invention. The ends 4 of the tubes 2 and 3 and their connections are identical. The ends 4 are upset so as to provide external shoulders 5.

The housing is formed in three parts—one of which has two annular members 6 and 7 adapted to encircle the ends of the tubes 2 and 3. The annular portions 6 and 7 are connected by a web which prevents them from separating when subjected to pressure which inevitably occurs when they are in use and the U bend 1 is removed to permit access to the interior of the tubes 2 and 3.

Upwardly extending side walls 8 and 9 are formed on one side of each of the annular portions. The other sections 10 and 11 of the housing consist of segmental portions 12 which are fitted to the interior of the annular members and have shoulders 13 which rest upon the upper surface of the annular members. These segmental portions have shoulders 14 formed on their inner surface which are fitted to the shoulders 5 on the exterior of the tubes. Corresponding shoulders are formed on one-half of the inner surface of each of the annular members 6 and 7 so that when the segmental portions 12 are inserted into the annular members the shoulders thereon and those formed on the segmental portions will form a continuous shoulder, against which the shoulders 5 on the tubes 2 and 3 may abut. Slots 15 are formed in each of the upwardly extending walls of the housing to receive toggles 16 in which I mount set screws 17. The ends of these set screws 17 engage abutments 18 formed on the outer wall of the U bend 1 so that by tightening the set screws 17 the end faces of the tubes 2 and 3 will be drawn tightly against the faces of the return or U bend 1 forming a leak-proof joint.

The fitting is assembled as follows: the annular portions are passed over the ends of the tubes 2 and 3, the segmental portions 12 of the other two sections of the housing are inserted intermediate the tubes and the annular members 6 and 7. The toggles 16 are then placed in the slots 15, the set screws 17 are tightened. This draws the shoulders formed by the segmental portions 12 and the annular members 6 and 7 against the shoulders on the tubes and in turn this forces the ends of the tubes against the face of the return bend forming a leakproof joint. Although I have shown a specific type of joint it will be obvious to persons skilled in the art that no special type of joint is necessary; also that the type of toggle used may be varied without departing from my invention.

A modified form of my invention is shown in Figs. 7 to 13. As shown in the drawings of this modification, I provide a housing formed in three pieces, one member of which is provided with two annular members 22 and 23, which are adapted to encircle the ends of a pair of tubes 24 and 25. These tubes are connected by a conventional return bend 21, which is mounted in the housing and has its base seated upon the ends of the tubes 24 and 25. The annular members 22 and 23 are provided with inwardly extending arcuate shoulders 26 and 27, which are adapted to engage beneath the shoulders 28 and 29 of the tubes 24 and 25.

I provide upwardly extending side walls 30 and 31, which are cast or forged integral with the annular members 22 and 23. The other two segments of the housing comprise upwardly extending side walls 32 and 33, which are provided with downwardly extending portions, arcuate in cross sections and which are provided with inwardly extending shoulders 34 and 35, which are adapted to engage beneath the shoulders 28 and 29, formed by the upset portions of the tubes 24 and 25. The outer parts of the upwardly extending side walls 30 and 31 are provided with hook shaped portions 37, formed on the corresponding or mating portions of the upwardly extending sections 32 and 33. This construction enables the side walls to be locked together. A pin 38 is inserted in the adjoining walls at their point of junction so that any longitudinal movement is effectually prevented. Slots 39 are formed adjacent to the upper ends of the upwardly extending side walls and toggles 40 are mounted in these slots. These toggles carry set screws 41, the ends of which are adapted to engage abutments 42 and 43 formed on the external surface of the return bend 21.

These abutments are directly in line with the axis of the tubes so that the pressure exerted is in direct line with the tube center.

The modified form of my device is assembled in the following manner. The tubes 24 and 25 are passed upwardly through the annular members 22 and 23, until the shoulders 28 and 29 are sufficiently above the annular members to permit the arcuate portions of the sections 32 and 33 to be inserted intermediate the annular members and the walls of the tubes. This will provide, by means of the shoulders 26 and 34, and 27 and 35, for a continuous inwardly extending shoulder, upon which the shoulders 28 and 29 on the tubes may rest. The return bend 21 is then placed in the housing, the toggles are fitted into the slots, and the set screws tightened up. Obviously this will draw the annular members upwardly against the shoulders on the tubes, and this will bring the tubes tightly against the face of the return bend so that a leak-proof joint will be formed.

Figure 13:
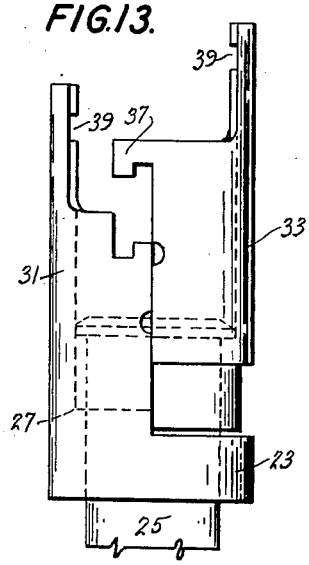
Fig. 13 is an end elevation of the parts showing the method of assembling the same, a fragmentary portion of the tube being shown in this view.
Figure 14:
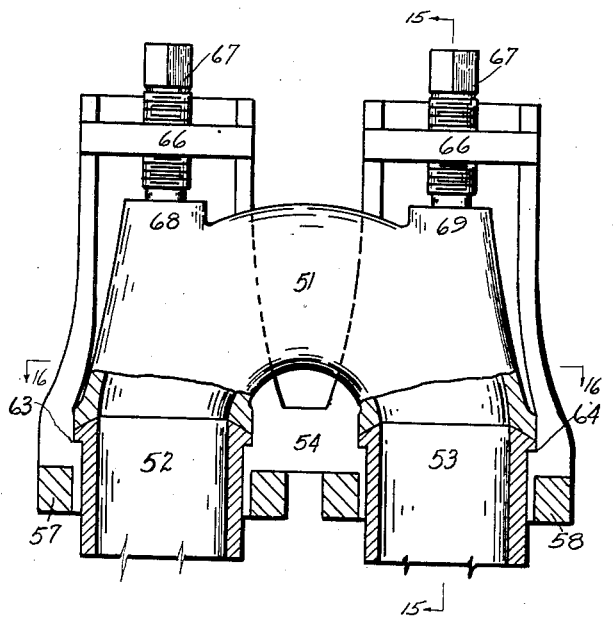
Fig. 14 is a side elevation of a modified form of housing, part of the housing being broken away to show the interior construction.
Figure 15:
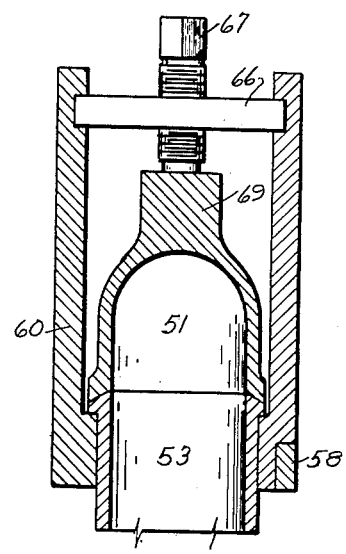
Fig. 15 is a section on the line 15—15 in Fig. 14.
Figure 16:
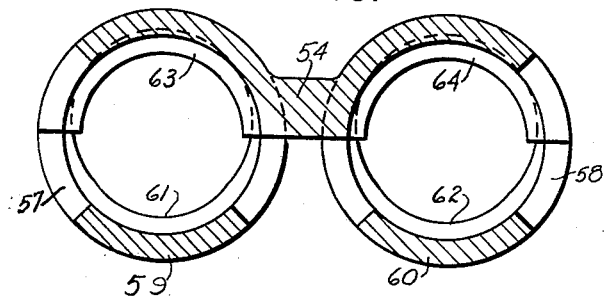
Fig. 16 is a section on the line 16—16 in Fig. 14.
Figure 17:
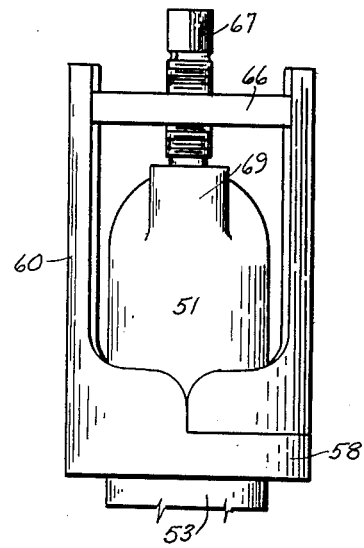
Fig. 17 is an end elevation.
Figure 21:
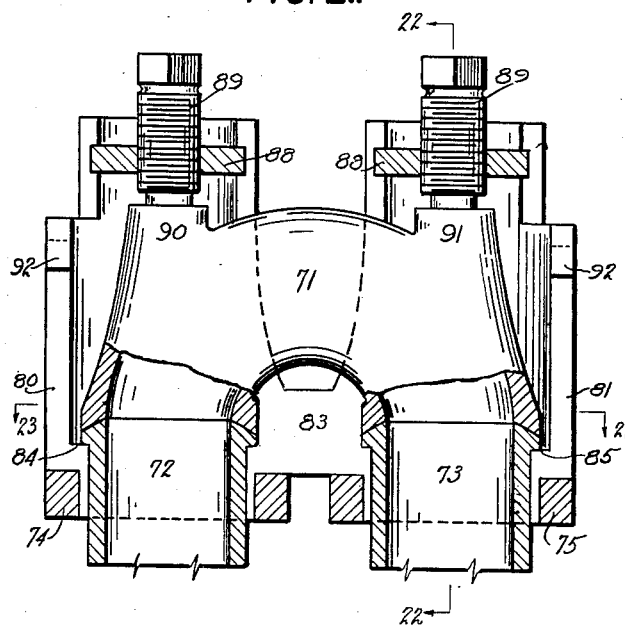
Fig. 21 is a side elevation showing a modified form of construction.
Figure 22:
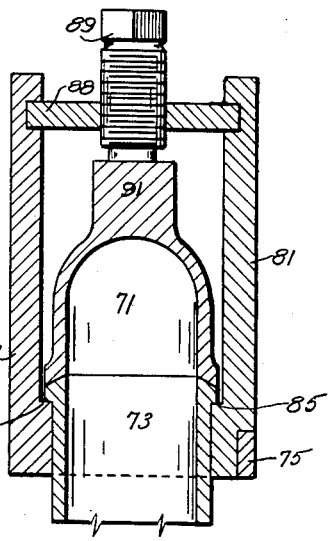
Fig. 22 is a section taken on the line 22—22 in Fig. 21.
Figure 23:
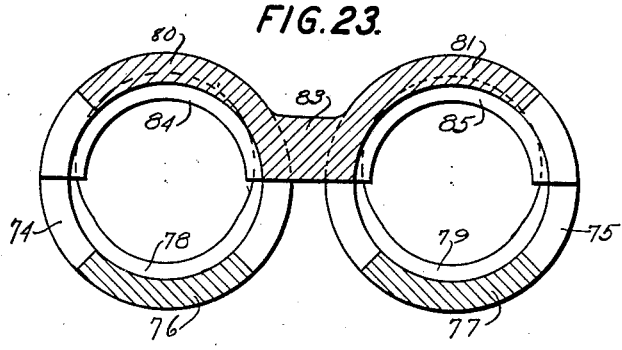
Fig. 23 is a cross section taken on the line 23—23 in Fig. 21.
Figure 24:
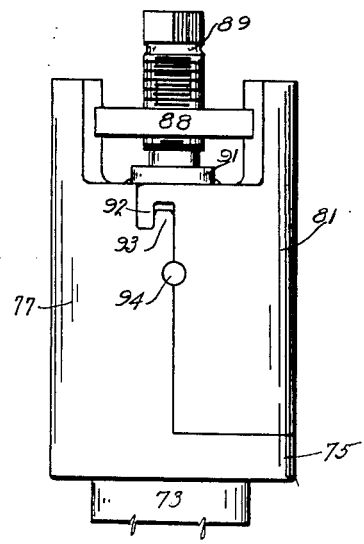
Fig. 24 is an end elevation of this form of construction.
Figure 25:
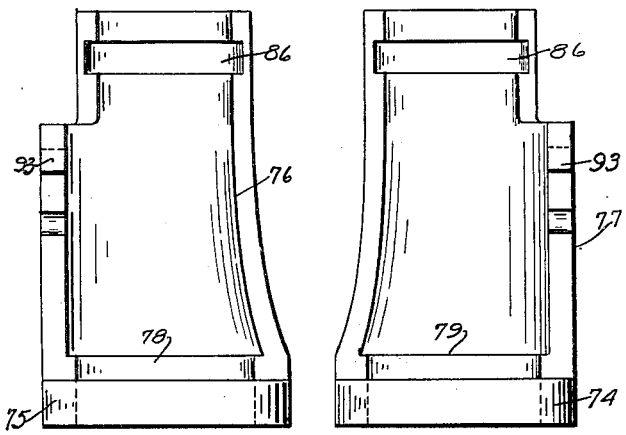
Fig. 25 is a detail view of a modified form of construction for the housing.
Figure 27:
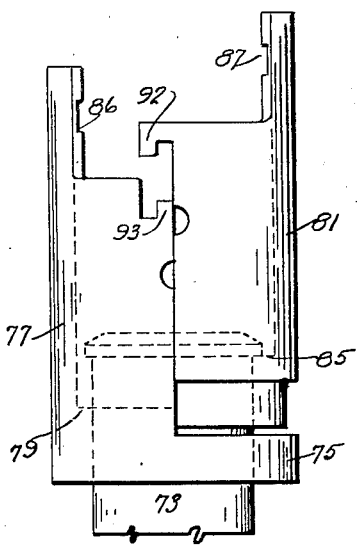
Fig. 27 is an end elevation showing the method of assembly.
Figure 26:
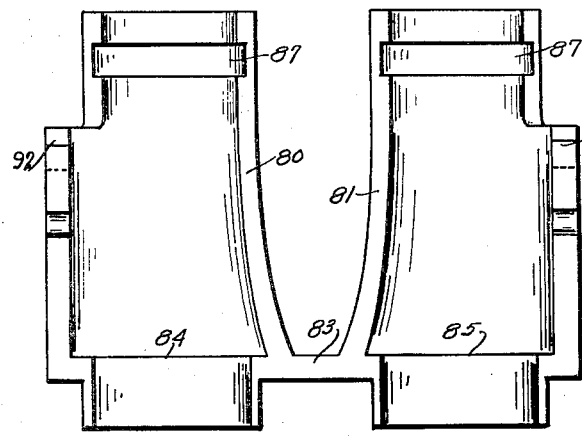
Fig. 26 is a detail view of the fragmentary portion of the housing for this construction.

By constructing the upwardly extending walls in the manner described and clearly illustrated in Fig. 13, it is apparent that any tendency on their part to spread is completely overcome and no longitudinal movement is possible for them, thus insuring that the ends of the tubes will be held rigid after the U bend is removed for the purpose of cleaning the accumulation of coke from the inside of the tubes, which, as is well known, is frequently necessary in all refineries.

Another modified form is shown in Figs. 14 to 20. As shown in the drawings of this modification, a conventional return bend 51 is mounted in a sectional housing and is adapted to furnish connection to a pair of tubes 52 and 53, so as to provide a continuous passageway therethrough. As illustrated the face of the return bend is adapted to contact the ends of the tubes 52 and 53, so it will be obvious to persons skilled in the art that any type of joint may be employed without departing from the scope of my invention.

As illustrated the housing is formed in three sections, one of which is joined together by a web 54. The other two are formed separately and each of them has an annular member 57 and 58 which is adapted to encircle the ends of a pair of tubes. These separate annular members 57 and 58 are provided with upwardly extending side walls 59 and 60, which are cast or forged integral with the annular members 57 and 58. Inwardly extending arcuate shoulders are formed on the inner wall of the annular members and extend for one-half of the distance around the annular members. These shoulders 61 and 62 are adapted to engage shoulders formed by upsetting the ends of the tubes 52 and 53. The other section of the housing, which is connected by the web 54 is provided with downwardly extending arcuate portions, adapted to be inserted into the annular members intermediate the outer walls of the tube and the inner walls of the annular members 57 and 58. These downwardly extending portions are provided with inwardly extending arcuate shoulders 63 and 64, so that when they are inserted in the annular members the shoulders form a continuous shoulder, upon which the shoulders of the tubes rest. Slots 65 are formed in the upwardly extending side walls adjacent to their tops, in which are mounted toggles 66, which carry set screws 67 adapted to engage abutments 68 and 69 formed on the external walls of the return bend 51.

It will be obvious to persons skilled in the art that by means of this construction the tightening of the set screws will serve to produce a leak-proof joint and that any tendency to dislodge the return bends from the ends of the tubes will be resisted, not by the tensile strength of a bolt, but by the compression of the set screws, thus furnishing a type of construction for this purpose which has been highly satisfactory in actual practice.

The means of assembly is almost obvious. The ends of the tubes 52 and 53 are inserted into the annular members 57 and 58, until their shoulders are sufficiently above the upper surfaces of the annular members to permit the arcuate portions of the half of the housing to be inserted into the annular members 57 and 58, their shoulders 61, 62, 63, and 64 serve as abutments upon which the shoulders on the tubes 52 and 53 rest. The return bend is then mounted in position and by tightening the set screws the return bend will be tightly pressed against the end of the tubes, forming a leak-proof joint.

Another modified form is shown in Figs. 21 to 27. As shown in the drawings for this invention, a return bend 71, which is of conventional design, is arranged to connect a pair of still tubes 72 and 73 so as to provide a continuous passageway therethrough. The return bend is mounted in a housing which is formed in three parts. Two separate annular portions 74 and 75 are cast or forged with upwardly extending side walls 76 and 77 formed integral therewith. The inner surface of the annular member adjacent to the side walls 76 and 77 is provided with inwardly extending arcuate shoulders 78 and 79. The other part of the housing is formed by two upwardly extending side walls 80 and 81 corresponding to the side walls 76 and 77. These walls are connected by means of a web 83. The side walls 80 and 81 are provided with downwardly extending arcuate portions adapted to be inserted into the annular members 74 and 75 intermediate the outer walls of the tubes and the inner surface of the annular members. These arcuate portions are provided with inwardly extending shoulders or flanges 84 and 85, which when the arcuate portions are inserted into position in the annular members, lie in the same plane as the shoulders 78 and 79 formed on the annular members 76 and 77, thus forming a continuous shoulder which is adapted to engage the shoulder formed on the tubes 72 and 73. Slots 86 and 87 are provided in the upwardly extending side walls, and are adapted to receive toggles 88 in which are mounted set screws 89, the inner ends of which engage abutments 90 and 91, formed on the external surface of the return bend 71.

It will be apparent to persons skilled in the art that by tightening the set screws the face of the return bend will be forced into tight engagement with the ends of the tubes, thus forming a leak-proof joint, although it will also be apparent that any type of joint may be employed and the invention is not restricted or confined to any specific type.

The upwardly extending side walls 80 and 81 at the ends are formed with outwardly and downwardly extending hooks 92, which are adapted to engage registering hooks 93 formed on the side walls 76 and 77. It will be quite apparent that when these hooks are in place that the housing will be practically as if it were made of one piece. In order to prevent its separation when the tubes have to be cleaned and the U bend is removed I provide a detachable pin 94, which is inserted in a hole, one half of which is formed in each of the mating side walls. This serves to securely lock the housings against displacement at any time, and permits the removal of the return bend without any possibility of the housing falling apart.

Having described my invention what I regard as new and desire to secure by Letters Patent is:

1. In a refinery apparatus, a return bend adapted to connect the ends of a pair of tubes, a sectional housing comprising annular portions adapted to encircle the ends of the pair of tubes and to be locked thereto, a pair of upwardly extending side walls on said annular members, a pair of side walls having arcuate portions adapted to be inserted into said annular members intermediate the tubes and the annular members, inter-engaging means on said side walls to lock them together, and means mounted in said side walls to contact said return bend and form a leak-proof joint.

2. In a refinery apparatus, a return bend adapted to connect the ends of a pair of tubes, a sectional housing comprising annular portions adapted to encircle the ends of the pair of tubes and to be locked thereto, a pair of upwardly extending side walls on said annular members, a pair of side walls having arcuate portions adapted to be inserted into said annular members, intermediate the tubes and the annular members, a hook on each side wall adapted to engage a registering hook on the mating side walls, and means mounted in said side walls to contact said return bend and form a leak-proof joint.

3. In a refinery apparatus, a return bend adapted to connect the ends of a pair of tubes, a sectional housing comprising annular portions adapted to encircle the ends of the pair of tubes and to be locked thereto, a pair of upwardly extending side walls on said annular members, a pair of side walls having arcuate portions adapted to be inserted into said annular members, intermediate the tubes and the annular members, inter-engaging means on said side walls to lock them together, and means mounted in said side walls to contact said return bend and form a leak-proof joint, and detachable means to prevent longitudinal movement and disengagement of said side walls.

4. In a refinery apparatus, a return bend adapted to connect the ends of a pair of tubes having shoulders adjacent their ends, a sectional housing comprising annular portions adapted to encircle the ends of the pair of tubes and shoulders, and to be locked thereto, a pair of upwardly extending side walls on said annular members, a pair of side walls having arcuate portions adapted to be inserted into said annular members, intermediate the tubes and the annular members, interengaging means on said side walls to lock them together, and means mounted in said side walls to contact said return bend and form a leak-proof joint.

5. In a refinery apparatus, a return bend adapted to connect the ends of a pair of shouldered tubes, a sectional housing comprising annular portions adapted to encircle the ends of the pair of tubes and shoulders and to be locked thereto, a pair of upwardly extending side walls on said annular members, a pair of side walls having arcuate portions adapted to be inserted into said annular members, intermediate the tubes and the annular members, interengaging means on said side walls to lock them together, and means mounted in said side walls to contact said return bend and form a leak-proof joint, and detachable means to prevent longitudinal movement and disengagement of said side walls.

6. In a refinery apparatus, a conventional return bend adapted to connect a pair of tubes to provide a passageway therethrough, a sectional housing therefor comprising two separate annular members adapted to encircle the ends of a pair of tubes and to be locked thereto, an upwardly extending side wall on each member, a pair of side walls, having arcuate portions thereon, adapted to be inserted in the separate annular members intermediate the tubes and the annular members, means to connect the separate side walls together, and detachable means mounted in said side walls to produce a leak-proof joint.

7. In a refinery apparatus, a conventional return bend adapted to connect a pair of tubes to provide a passageway therethrough, a sectional housing therefor comprising two separate annular members adapted to encircle the ends of a pair of tubes and to be locked thereto, an upwardly extending side wall on each member, a pair of side walls, having arcuate portions thereon, adapted to be inserted in the separate annular members intermediate the tubes and the annular members, means to connect said annular members whereby the side walls on the separate members are held together, detachable means mounted in said side walls to produce a leak-proof joint, and inter-engaging means on side walls to lock them together.

8. In a refinery apparatus, a conventional return bend adapted to connect a pair of tubes to provide a passageway therethrough, a sectional housing therefor comprising two separate members adapted to encircle the ends of a pair of tubes and to be locked thereto, an upwardly extending side wall on each member, a pair of side walls having arcuate portions thereon, adapted to be inserted in the separate members intermediate the tubes and the said members, means to connect said annular members whereby the side walls on the separate members are held together, detachable means mounted in said side walls to produce a leak-proof joint, and means on said side walls to lock them together, and detachable means to prevent longitudinal movement and disengagement of said means.

9. In a refinery apparatus, a conventional return bend adapted to connect a pair of tubes to provide a passagewy therethrough, a sectional housing therefor comprising two separate annular members adapted to encircle the ends of a pair of tubes and to be locked thereto, an upwardly extending side wall on each member, a pair of side walls having arcuate portions thereon, adapted to be inserted in the separate annular members intermediate the tubes and the annular members, means to connect said annular members whereby the side walls on the separate members are held together, detachable means mounted in said side walls to produce a leak-proof joint, inter-engaging means on said side walls to lock them together, said means comprising a hook on each side wall adapted to engage a registering hook in the mating side walls.

10. In a refinery apparatus, a conventional return bend adapted to connect a pair of tubes to provide a passageway therethrough, a sectional housing therefor comprising two separate annular members adapted to substantially encircle the ends of a pair of shouldered tubes and to be locked thereto, an upwardly extending side wall on each annular member, a pair of side walls, having arcuate portions thereon, adapted to be inserted in the separate annular members intermediate the tubes and the annular members, thereby connecting the side walls on the separate members together whereby when the arcuate portions are inserted and the tubes mounted in the annular members, the tubes will be held in alinement when the return bend is removed, detachable means mounted in said side walls to produce a leak-proof joint, internal shoulders on said annular members and said arcuate portions adapted to engage the shoulders formed on said tubes.

11. In a refinery apparatus, a conventional return bend adapted to connect a pair of tubes to provide a passageway therethrough, a sectional housing therefor comprising two separate annular members adapted to substantially encircle the ends of a pair of tubes and to be locked thereto, an upwardly extending side wall on each annular member, a pair of connected side walls, having arcuate portions at their lower ends, adapted to be inserted in the separate members intermediate the tubes and said members, means to connect the said side walls of the separate members to the pair of side walls, detachable means to prevent their disconnection, detachable means mounted in said side walls to produce a leak-proof joint.

12. In a refinery apparatus, a conventional return bend adapted to connect a pair of tubes to provide a passageway therethrough, a sectional housing therefor comprising two separate annular members, each of which has an upwardly extending side wall integral therewith, arcuate shoulders on the inner surface of the annular portions in register with the upwardly extending side walls, said annular portions being adapted to encircle the ends of a pair of shouldered tubes and to be locked thereto, a pair of connected side walls having arcuate shouldered portions thereon, adapted to be inserted in the annular portions of said separate members, intermediate the tubes and the said members, whereby the said shouldered portions will register with said arcuate shoulders and abut the shoulders on the tube, interengaging means which connect each pair of side walls, means to prevent the disengagement of said interengaging means and means mounted detachably in said side walls to draw the return bends and tubes into a leak-proof joint.

13. In a refinery apparatus, a conventional return bend adapted to connect a pair of shouldered tubes to provide a passageway therethrough, a compound housing comprising a pair of annular members adapted to encircle the ends of a pair of tubes, and to be locked thereto, a plurality of upwardly extending side walls, two of which have segmental portions to be inserted in the annular portion intermediate the tubes and the annular portions, one pair of the upwardly extending side walls having a web which connects them to arcuate shouldered portions adapted to register with shoulders formed on the inner surface of the annular portions whereby when the return bend is assembled the tubes will be held on center and in alinement, means to prevent the longitudinal movement of the housing sections when the return bend is removed and means detachably mounted in said side walls to draw the return bend and tubes into a leak-proof joint.

FRED C. FANTZ.